(12) United States Patent
Dubost et al.

(10) Patent No.: US 6,491,230 B1
(45) Date of Patent: Dec. 10, 2002

(54) CONTACTLESS BADGE READER (75) Inventors: Jean-Pierre Dubost, Versailles (FR); Etienne Dubocquet, Vernouillet (FR); Vincent Petit, La Coquette (FR)

(73) Assignee: Thomson-CSF Detexis, Elancourt (FR)

(*) Notice: Subject to any disclaimer, the term of this patent is extended or adjusted under 35 U.S.C. 154(b) by 0 days.

(21) Appl. No.: 09/764,984

(22) PCT Filed: Jul. 20, 1999

(86) PCT No.: PCT/FR99/01772
§ 371 (c)(1),
(2), (4) Date: Mar. 9, 2001

(87) PCT Pub. No.: WO00/05676
PCT Pub. Date: Feb. 3, 2000

(30) Foreign Application Priority Data

Jul. 21, 1998 (FR) .............................. 98 09295

(51) Int. Cl.⁷ .............................. G06K 19/06
(52) U.S. Cl. ................. 235/492; 235/375; 235/472.02; 235/462.46; 340/10.1; 340/10.3; 343/867
(58) Field of Search ................ 235/380, 375, 235/377, 435, 451, 462.46, 472.02, 492; 340/10.1–10.6; 343/867

(56) References Cited

U.S. PATENT DOCUMENTS

| | | | |
|---|---|---|---|
| 4,318,109 A | * 3/1982 | Weathers | 343/806 |
| 4,926,182 A | * 5/1990 | Ohta et al. | 342/44 |
| 4,963,887 A | * 10/1990 | Kawashima et al. | 342/44 |
| 5,089,829 A | * 2/1992 | Haruyama et al. | 343/790 |
| 5,353,011 A | * 10/1994 | Wheeler et al. | 340/572 |
| 5,491,715 A | * 2/1996 | Flaxl | 375/344 |
| 5,500,651 A | * 3/1996 | Schuermann | 342/42 |
| 5,519,386 A | * 5/1996 | Tobergte | 340/10.34 |
| 5,550,536 A | * 8/1996 | Flaxl | 340/825.34 |
| 5,347,280 A | * 9/1997 | Schuermann | 342/42 |
| 5,703,573 A | * 12/1997 | Fujimoto et al. | 340/10.3 |
| 5,745,846 A | * 4/1998 | Myer et al. | 455/209 |
| 5,847,662 A | * 12/1998 | Yokota et al. | 340/825.54 |

FOREIGN PATENT DOCUMENTS

| | | |
|---|---|---|
| EP | 0 253 368 | 1/1988 |
| EP | 0 638 871 | 2/1995 |
| EP | 0 838 780 | 4/1998 |
| GB | 2 237 479 | 5/1991 |

* cited by examiner

Primary Examiner—Karl D. Frech
Assistant Examiner—Seung Ho Lee
(74) Attorney, Agent, or Firm—Oblon, Spivak, McClelland, Maier & Neustadt, P.C.

(57) ABSTRACT

A reader for contactless badges which includes a transmitter and receiver. The transmitter and receiver operate on the same carrier frequency, and are connected by a coupling circuit to an antenna. The reader further includes a management device for interacting with the transmitter and receiver for establishing a dialog with a badge. The coupling circuit to the antenna includes a delaying element, traversed by the connection between the transmitter and the antenna, while the receiver includes two channels, starting off on either side of the delaying element. The management device is then arranged to selectively operate the reception channels according to selected criterion.

27 Claims, 8 Drawing Sheets

CONTACTLESS BADGE READER

BACKGROUND OF THE INVENTION

1. Field of the Invention

The invention involves an electronic device capable of interacting with electronic identification and/or transaction devices, called here generically "badges".

2. Discussion of the Background

Different types of badges are currently used, in various forms, as means of identification and/or for carrying out a transaction. "Transaction" is understood to mean here any operation aiming to validate any right, whether this consists of a right of access that is physical (a toll, for example) or immaterial (access to information), or a right to give and/or receive any benefit, whether monetary or not, in relation to a service, whatever the nature of the service may be.

The badges most widely used at present are memory cards, the majority of which interact with a reader through an electronic connection. Different proposals with the aim of reading the badge, and writing on it if necessary being carried out without contact, have emerged. But the diversity of these proposals runs counter to standardization, and consequently to the development of badges that are readable without contact; the practical relevance of these is, however, undeniable.

In addition, in the absence of physical contact, there is a risk of interference between several co-existing contactless connections that are initiated at the same time, for example between two badges and a single contactless reader, or between two badges and two contactless readers next to one another.

SUMMARY OF THE INVENTION

It is therefore desirable to develop a contactless reader that is sturdy, has low additional costs, is not very sensitive to interference, and is versatile, while performing comparably to readers already in use.

The Applicant was confronted with this problem.

The current invention provides a structure for a contactless reader that improves the situation appreciably.

The contactless badge reader proposed is of the type including transmission means and reception means, working more or less on the same carrier frequency, and linked by a coupling circuit to an antenna; it also includes management means, which interact with the transmission means and reception means to establish a dialogue with a badge.

The main characteristic of the invention is that the coupling circuit to the antenna includes a delay element, crossed by the connection between the transmission means and the antenna; the reception means comprise two channels, beginning on either side of this delay element; and the management means are arranged to make use of the reception channels selectively, according to a chosen criterion, in particular selecting one of the reception channels according to a chosen criterion.

An advantage is that the delay of the delay element is more or less equal to an eighth of the wavelength of the carrier frequency, up to close to a complete number of half-wavelengths. In one specific instance, the delay element includes a capacitor.

Another aspect of the invention is that the coupling circuit to the antenna operates at low impedance.

BRIEF DESCRIPTION OF THE DRAWINGS

Other characteristics and advantages of the invention will become apparent on examination of the following detailed description, as well as in the attached drawings, of which.

DESCRIPTION OF THE PREFERRED EMBODIMENTS

The attached drawings contain many elements which are, for the most part, of a certain nature. Consequently, they may not only serve to improve understanding of the invention, but also contribute towards its definition, if the need arises.

The reader will now be described, it being noted that the word "reader" most often indicates an electronic device capable of interacting with a badge, not only to read it, but also to write information upon it.

Figure 1:
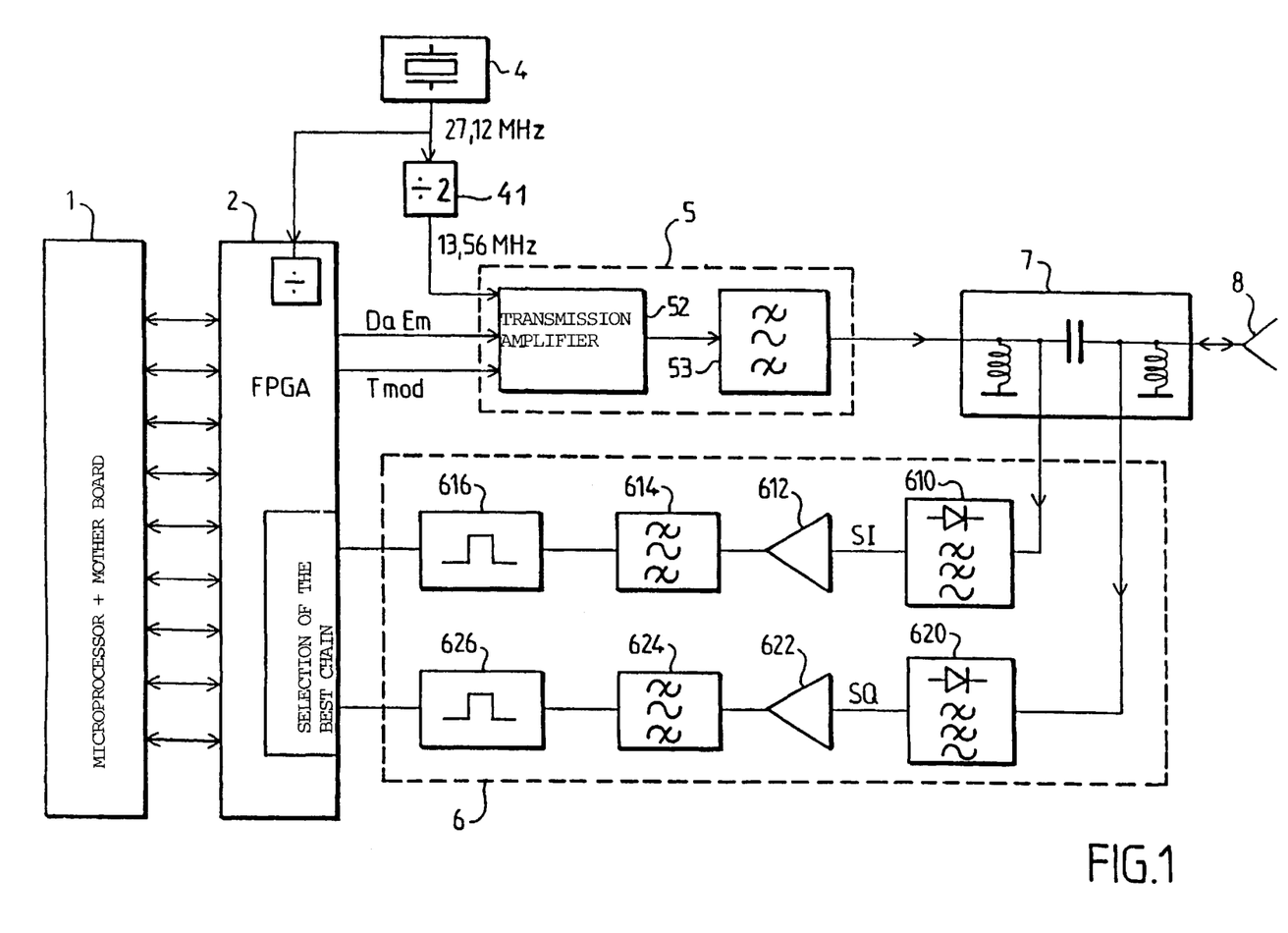
FIG. 1 is a general functional diagram of a specific design of a contactless badge reader following the invention.

In FIG. 1, reference 1 designates a mother board equipped with a microprocessor, and reference 2 a programmable network, which here is of the Field Programmable Gate Array ("FPGA") type.

Reference 4 designates a quartz element operating preferentially at 27.12 MHz. Element 41 allows for a division by two of the frequency of the quartz element, providing a frequency of 13.56 MHz.

In a method described below, antenna coupling circuit 7 provides two reception outputs. These are applied to reception means 6, which contains as a consequence a double line of reception. There are, in parallel, demodulators and input filters 610 and 620, reception amplifiers 612 and 622, reception band-pass band filters 614 and 624, as well as imposition circuits 616 and 626.

In total, transmission circuit 5 comprises transmission amplifier module 52, which receives DaEm data for transmission, a Tmod command that determines the type of modulation to apply to DaEm, as well as the frequency of 13.56 MHz already mentioned. The output of transmission amplifier 52 is applied to transmission filter 53, the output of which is linked to coupling circuit 7 towards antenna 8.

Figure 2:
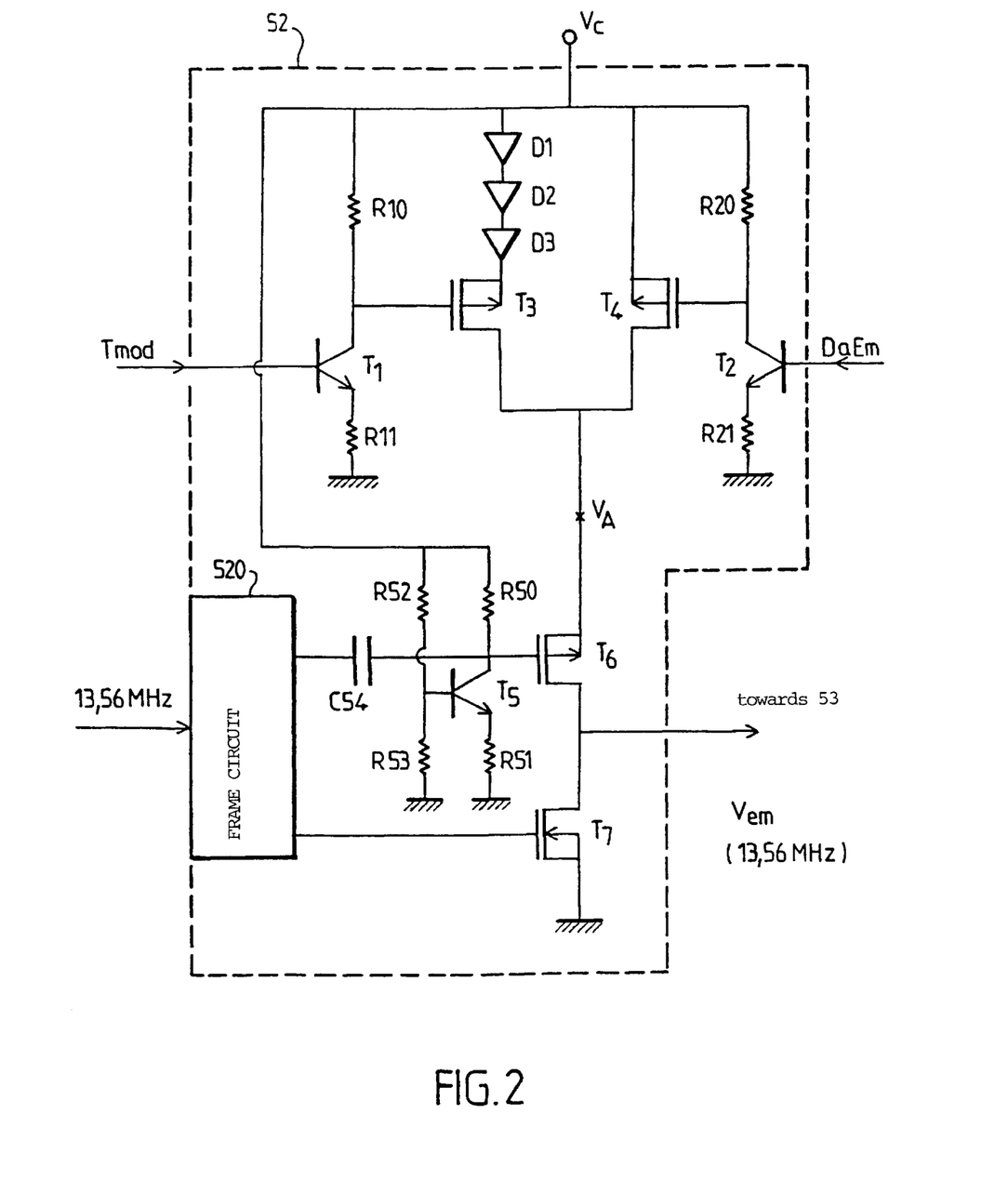
FIG. 2 is a more detailed diagram of module 52 of FIG. 1.

Transmission amplifier 52 will now be described. As shown in FIG. 2, its output stack is made up of two field effect transistors T6 and T7, of opposite types and mounted in series, their common point providing Vem output at 13.56 MHZ towards filter 53. From the fill Vc voltage supply, an NPN type transistor T5 is supplied with collector and emitter R51 resistances, as well as a polarisation of its base by resistances R52 and R53. The collector of transistor T5 is linked on one side to the grid of field effect transistor T6 and on the other side via a capacitor C54 to a frame circuit 520, which receives the carrier frequency at 13.56 MHz. Each time that it passes from 0 to 5 volts, this square carrier signal at 13.56 MHz will block transistor T6, and by consequence unblock transistor T7. Reciprocally, any movement of the same signal from 5 volts to 0 volts leads to the inverse commutation.

The function of frame circuit 520 is the imposition of input signals thus applied to transistors T6 and T7, in a way that ensures that these two transistors T6 and T7 are never both in a conducting state, which could lead to their being damaged or even destroyed.

In consequence, the Vem voltage moves alternately from 0 volts, for T6 blocked and T7 conducting, to a voltage slightly less than Vc, for T6 conducting and T7 blocked. This enables a signal of peak to peak amplitude practically equal to Vc to be obtained, while at the same time obtaining a low output impedance.

A transmission command signal is in addition applied to the base of an NPN type transistor T2, the emitter of which is linked to a resistance R21, itself connected to a ground. The resistance of collector R20 of T2 controls the grid of a field effect transistor T4. When transistor T2 is conducting, transistor T4 is doing the same, creating at the VA point a voltage close to Vc, which allows the aforementioned functioning of the transmission circuit, On the other hand, in the absence of DaEm data to transmit, T2 and T4 are blocked and the voltage within VA is close to zero; the transmission circuit does not function.

In a similar way, the Tmod command signal makes a transistor T1, equipped with emitter resistance R11 and collector resistance R10, commutate. The collector of T1 controls the grid of field effect transistor T3. The source of T3 is linked to the Vc point by a chain of diodes D1 to D3, while its drain is linked to the VA point.

The functioning is as follows: when transistor T3 is blocked it is transistor T4 alone that determines the VA voltage. This VA voltage may be close to Vc, in the presence of a train of bits at the DaEm input that determines the status of transistor T2. Thus, a modulation of around 100% {"ASK 100%", for Amplitude Shift Keying 100%) is obtained for the Vem voltage.

When transistor T3 is operating, the status of transistor T4 determines afresh the voltage at the VA point. If transistor T4 is blocked, the VA voltage equals more or less the Vc voltage reduced by the drop in voltage caused by the internal resistances of each diode D1, D2, and D3. This voltage is the minimum voltage (not 0) that the VA voltage may have. A decrease or increase in the total number of diodes enables the value of the modulation in Vem amplitude to be refined. On the other hand, when transistor T4 is operating, transistor T3 and diodes D1 to D3 are short-circuited, and the voltage within VA more or less equals the Vc voltage. Thus, by presenting a train of bits at the DaEm input, an amplitude modulation of around 10% in the example described (ASK 10%) is obtained at the level of Vem transmission voltage.

Figure 3:
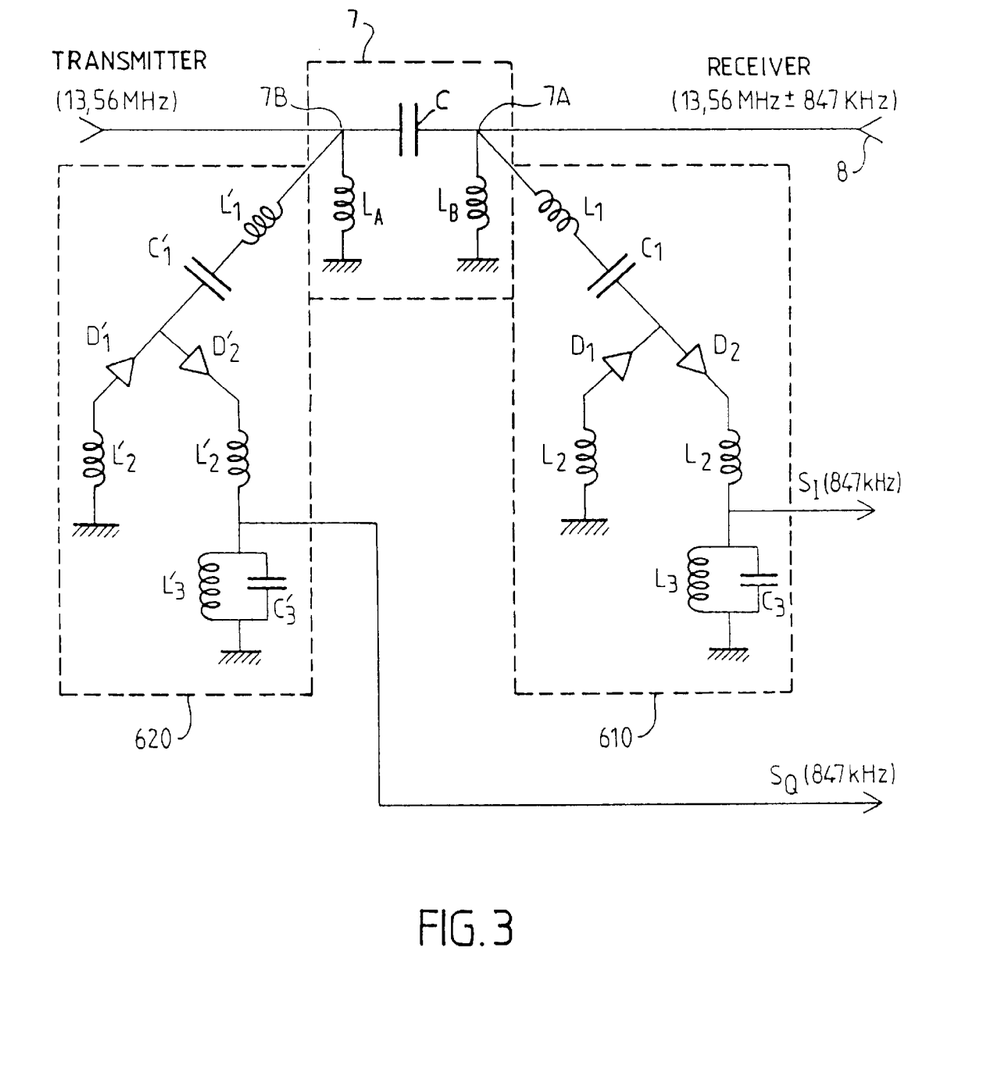
FIG. 3 is a more detailed diagram of modules 7, 610 and 620 of FIG. 1.

In FIG. 3, the Vem transmission signal crosses cell 7. This is a pi circuit, consisting of a capacitor C, with two inductances $L_A$ and $L_B$ of equal value in parallel on either side towards the ground. The output goes towards the antenna 8, which will now be described.

Figure 5A:
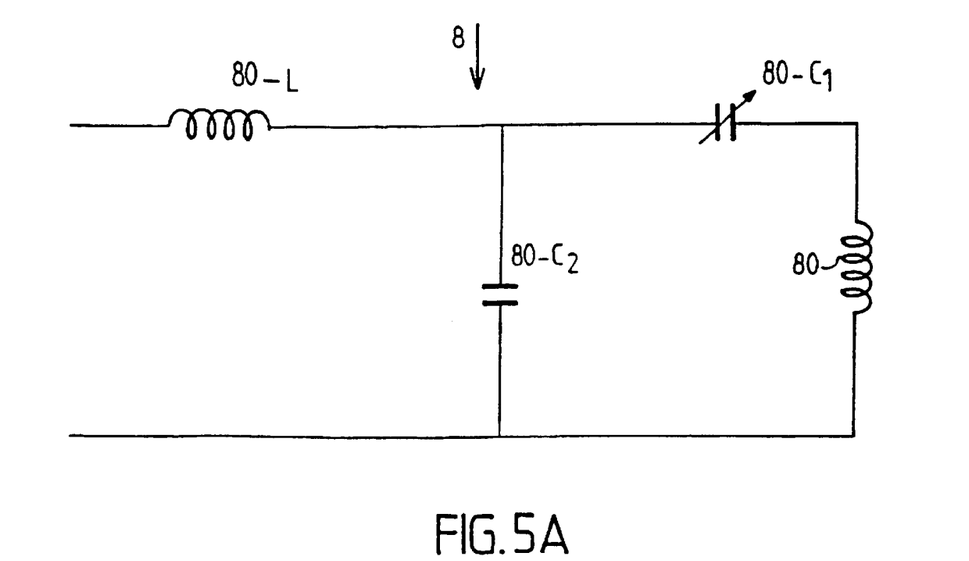
FIGS. 5A and 5B illustrate a preferential example of an antenna, an in principle diagram and an in practice diagram respectively.

The in principle diagram in FIG. 5A makes it appear that this antenna has an input inductance in series 80-L, followed, in parallel towards the second input wire, by a capacitor 80-C2. The common point at 80-L and 80-C2 is linked, through an adjustable capacitor 80-C1, to the radiating element itself, consisting of an inductance 80.

Figure 5B:
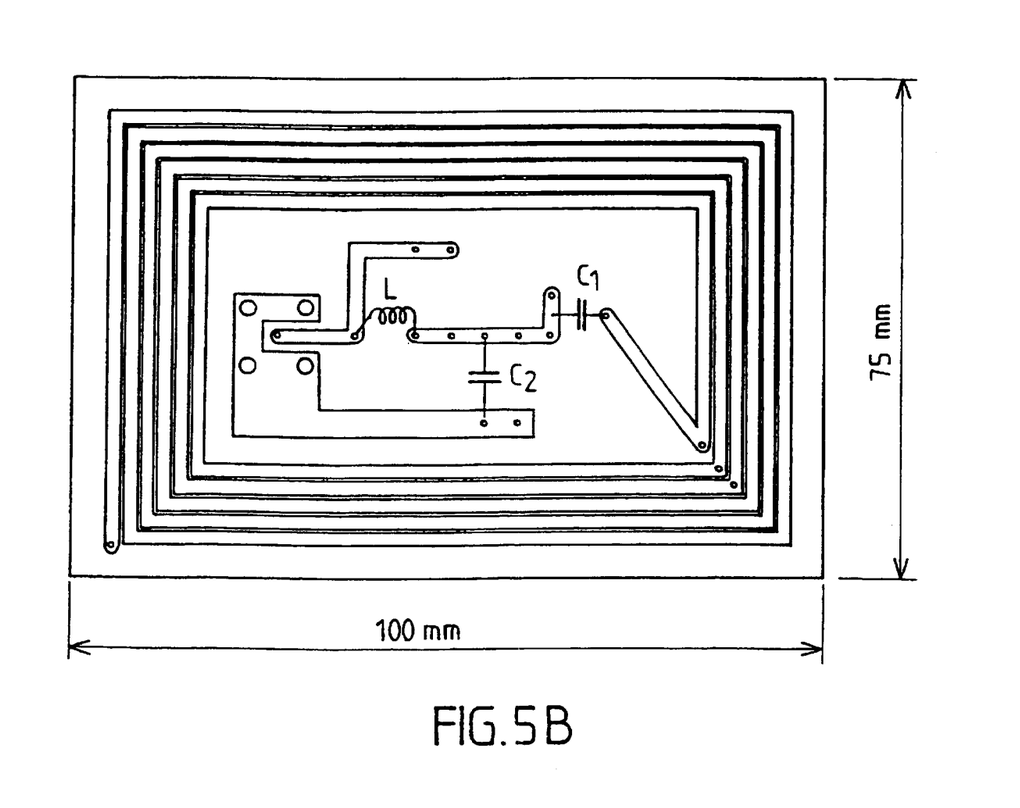

FIG. 5B shows how this antenna may be constructed by the coiling of six spirals etched onto a printed circuit, with at the center components 80-L, 80-C1 and 80-C2. The return connection between the free point (below) of 80-C2 and the other end of the spirals is situated on the opposite face of the printed circuit, and is not visible. Compared to other proposals, this antenna has the advantage of being of a very small size (100 mm×75 mm as indicated on FIG. 5B) and can be constructed on a very thin printed circuit, which may be modelled in the chosen fashion.

Furthermore, the elements 80-L, 80-C1 and 80-C2 are adjusted to adapt the antenna to a working impedance of 50 ohms.

It should be mentioned in passing that the basic function of transmission filter is to eliminate harmonic lines present in the largely rectangular signal output of transmission amplifier 52. According to the invention, the filter also carries out an adaptation of impedance between its input, which is at the impedance of around 10 ohms presented by transmission amplifier 52, and, within the output, the impedance of around 50 ohms presented by the antenna 8 with coupling circuit 7. This filter can be constructed with discrete components (inductances and capacitances), with a pass band wide enough for structural dispersion not to adversely affect performance. An excellent removal of harmonic frequencies may be obtained in this way, as well as a low production cost.

In addition, the assembly thus obtained does not allow completely reactive impedances to be presented to the signals received by the antenna. In this way, stationary disruptive wave phenomena within coupling circuit 7 are avoided, which is important as will now be seen.

At the working frequency, which here is 13.56 MHz, the pi circuit 7 behaves like a delay between points 7A and 7B (taking account, if need be, of the existing delays in the lengths of the connections involved). It is desirable to ensure that, at the working frequency, the time interval between points 7A and 7B corresponds to $1/8^{th}$ of the wavelength of the working frequency (or possibly to a whole multiple of a half-wavelength). In short, the pi circuit made up of the two inductances $L_A$ and $L_B$ and the capacitor C is equivalent, at frequencies close to 13.56 MHz, to a line length of around lambda/8, while presenting a characteristic impedance of 50 ohms.

Point 7A is linked to circuit 610, which consists of an inductance L1 in series, followed by a capacitor C1. A double alternating rectifier assembly is then seen: in one direction, the route passes through a diode D1 towards the ground via an inductance L2; in the other direction, the negative electrode of the capacitor C1 is linked to a diode D2, inverted with respect to D1, and ending up at another inductance L2, which has the same value as the first.

The positive terminal of inductance L2 connected to D2 is linked to a circuit consisting of an inductance L3 and a capacitor C3 in parallel towards the ground. This barrier circuit "L3-C3" is set at 847 kHz, so that it resonates at this frequency, while it practically short-circuits remnants of the carrier frequency of 13.56 MHz.

Usefully, this demodulation of the signals transmitted by the badge is virtually completely undisrupted by the strong transmission signal, present during reception. In addition, the value of inductance L2 can be chosen in such a way that the demodulation circuit presents a strong impedance at 13.56 MHz, and in consequence causes practically no loss in the transmission circuits. Furthermore, this circuit allows pre-filtering of the carrier frequency at 13.56 MHz. The output designated S1 at 847 kHz is received at the positive terminal of inductance L2.

From point 7B, stack 620 is constructed in exactly the same way, the corresponding elements being distinguished by a "premium". A signal SQ at 847 kHz is found at the output of inductance L2.

Those in the industry will understand that the signals SI and SQ obtained in this way correspond more or less to a signal in phase and a signal in quadrature, with respect to the carrier frequency. In fact, because of the return route on transmission and reception at a line length of lambda/8 doubled, this corresponds to lambda/4, and consequently to two signals in phase and in quadrature. The carrier wave, permanently available, usefully allows distance supplying of the badge and serves as a local oscillator.

In addition, series circuit L1, C1 is set more or less to 13.56 MHz. In consequence, it presents a high impedance at 847 kHz, and in this way avoids any leakage on the return of the 847 kHz frequency (demodulated signal) towards the high frequency transmission circuit.

The reception amplifier, which may be constructed in the usual way, is proportioned to have maximum gain, while ensuring that tension due to input noise remains at a lower level at the detection threshold of the module 2 circuit. Taking account of product gain x pass band, operational amplifiers can be used, bi-tension or mono-tension.

Next, the reception filter 614 or 624 screens out parasite signals, particularly noise outside the band. Its pass band is 400 kHz. This is therefore sufficient to allow a Manchester modulation (±106 kHz), while absorbing structural dispersion. Like transmission filter 53, filters 614 and 624 can be constructed as discrete elements, taking account of the fact that their bulk is not a critical parameter. The characteristic impedance of these filters may be set quite high, for example of the order of 2 kohms which avoids excess charging of the reception channels and in consequence avoids losses.

The output circuits 616 and 626 carry out an imposition, with the help of a Schmitt trigger and a transistor.

Here, the imposition becomes an output through a signal compatible with TTL logic, so as to be directly applicable to module 2. This assembly limits the channel's gain and eliminates a substantial portion of the noise. The rocking threshold is ideally determined by the level of noise.

Figure 4A:
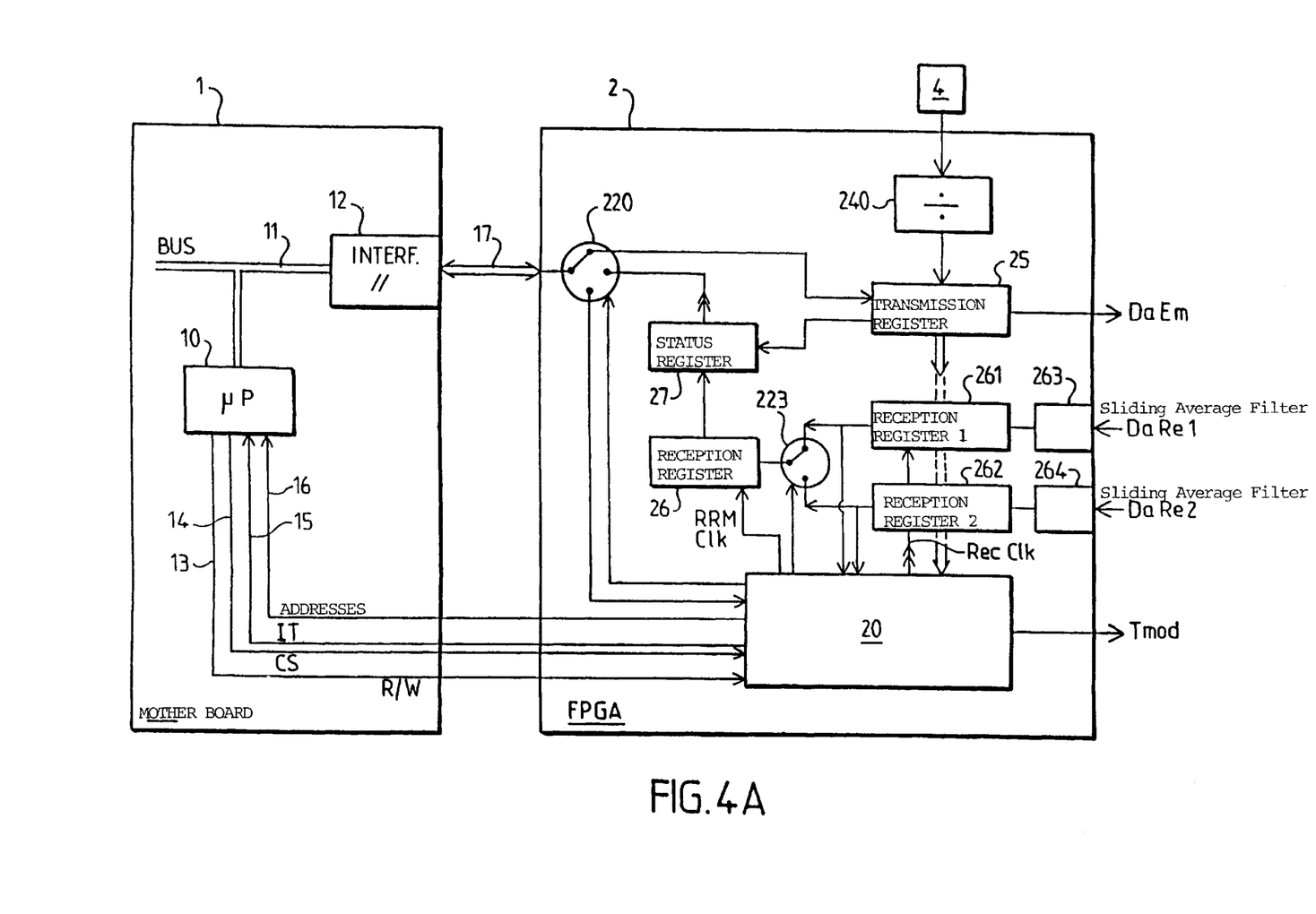
FIG. 4A is a more detailed diagram of modules 1 and 2 of FIG. 1.

The following paragraph refers to FIG. 4A. On the left, the mother board 1 (illustrated schematically to show its essential elements) contains a microprocessor 10, equipped with a bus 11 communicating with an interface 12 towards a parallel port. The microprocessor 10 (or another element of the card) is equally designed to manage an interruption input line (IT) 15 or an output line 14 towards a circuit selection (CS or "Chip Select") as well as command lines for reading and writing (R/W) 13 and for addresses 16. Module 1 may, for example, be constructed in the form of a mother board based on a micro-controller of the INTEL 386 EX type. The mother board CM manages and treats the data and thus controls module 2, linked on an FPGA circuit, available from the company XILINX, for example, reference XC5206. The FPGA provides the management of the transmission and reception phases, the synchronisation of signals and the extraction of bits on reception.

The configuration given here to the FPGA circuit will now be described. It contains a frequency divider 240 capable of effecting different divisions of the 27.12 MHz clock frequency put out by the quartz element 4. One of these frequencies allows data to be supplied at 106 kBits/s. The other frequencies serve to generate clock signals for internal use, under the control of function block 20, which will be described later.

Module 2 is configured to supply a commutator 220, the input into which communicates through a parallel bi-directional connection with the parallel interface 12 of module 1. The commutator 220 has a first output towards a transmission register 25, which supplies data to be transmitted DaEm, under the control of a printed circuit clock 240. Another output of the commutator 220 is linked to function module 20, for the charging of requests for commands and an indication of the number of bits to be transmitted. The commutator 220 also communicates with the status register 27 to pass on, mainly, beginnings and ends of the transmission and reception of data.

Conversely, the two DaRe1 lines entering from imposition circuit 616, as well as DaRe2 from imposition circuit 626, undergo treatment in 263 and 264—this will be returned to later—in order to fill respectively a first and second reception register 261 and 262. The contents of the two reception registers are communicated to function module 20. The outputs of the two reception registers are applied to a commutator 223, which allows them to be used to fill the message reception register 26. Under the command of a clock RRMCLK, defined by the function module or under its control, the register 26 may be discharged towards the parallel port 12 of module 1 via the commutator 220.

To sum up, the function module 20 commands the commutators 220 and 223, oversees the contents of registers 25, 261 and 262, controls the contents of register 26, controls the clocks for traffic between the different registers or outwards, and finally passes on the transmission command to transmission amplifier 52. Of course, these functions are not limiting.

Given that a programmable module is under discussion here, those in the industry will understand that the elements illustrated, concerning the commutation of registers or clocks, are principally aimed at explaining the module's functioning, but its operation by programme can be notably different from the representation by registers and circuits given in FIG. 4A.

Another function of module 20 is to control and operate the selection between the information received by the two reception channels, as will be seen below. For all of these operations, module 20 receives an excitation command (CS) on line 14, as well as reading and writing commands (R/W) on line 13, and can in return send interruptions (IT) on line 15 to the microprocessor 10. It maintains a dialogue with the microprocessor 10 through the intermediary of the bi-directional data bus 17. The FPGA registers are selected by decoding addresses (line 16) when the CS command is activated.

Figure 4B:
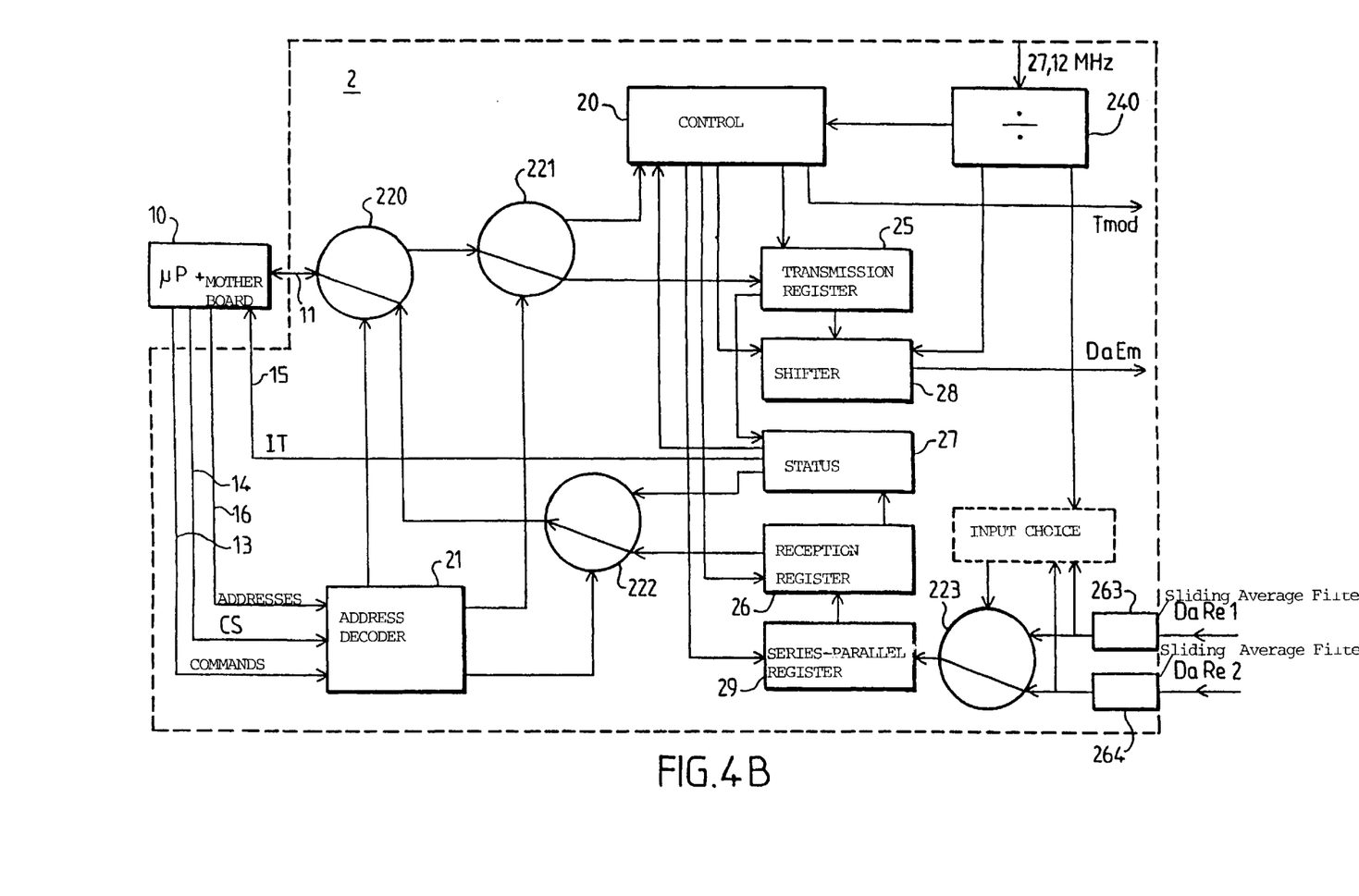
FIG. 4B is a more detailed diagram of 4A, and on which a variant of the reception block appears, including only a single reception register.

There follows a more detailed description of the respective functionings of the different FPGA registers; FIG. 4B should be referred to.

The FPGA contains within it a frequency divider 240 for dividing the clock frequency of 27.12 MHz, issuing from quartz element 4, into several frequencies that the FPGA uses. One frequency of 13.56 MHz is the frequency of modulation in transmission, which fixes the rate of functioning of the FPGA. A frequency of 847 kHz provides a comparison of the signals issued by the badge with a reference signal, as was seen above. A frequency of 53 kHz (106 kBits/s) represents the frequency of transmission and reception of packets of bits towards the badge or form the badge.

The different command signals for writing in and/or reading the internal registers that the different frequencies set the rate for are imposed by the control module 20.

Overall, module 2 maintains a dialogue with the micro-controller card (CM), with the help of signals of different kinds. The address signals (line 16) allow the designation of the different interface registers of the FPGA (transmission, reception, status register). The CS signals allow the micro-controller to select module 2 when there is a transfer of data. The command signals (line 13) allow the writing in and reading of FPGA registers. The bi-directional bus 11 provides for the passing on of commands, parameters and data from the micro-controller to the FPGA. The bus 11 also allows the status register and the data passed on from the FPGA to the micro-controller to be read.

The reading of and/or writing on module 2's various registers is done through decoding, with the help of address signals, CS and commands within the address decoder 21. These also manage the position of commutators 220, 221 and 222.

The FPGA sends the DaEm signal and the Tmod type of modulation command signal (ASK 100%, ASK 10%) towards the transmission channel, and receives the two signals DaRe1 and DaRe2 from the two reception channels. Module 20 controls the transmission registers, the shifter 28, the reception register 26 and the series-parallel register 29. It controls the clocks for transmission between the different registers, and supplies the Tmod type of modulation command. It is programmed by the micro-controller, which imposes on it a mode of functioning, in transmission or in reception.

When module 20 is programmed in transmission mode, the data written in the transmission register 25 by the micro-controller are sent towards the DaEm transmission channel, passing through the shifter 28, the rate for which is set by the internal clock at 53 kHz. An interruption signal (IT) is sent to the micro-controller when this is ready to send follow-up data to the FPGA, or to indicate to it the end of transmission of data.

When the control module 20 is programmed in reception mode, in the presence of the two signals to be received DaRe1 and DaRe1, the commutator 223, commanded by module 20, rocks onto one or the other of the reception channels 261 and 262. When a number of bits corresponding to a predetermined breadth of data to be transmitted to the micro-controller has been acquired, the control block 20 commands the transfer of data to the reception register 26, and the interruption signal IT becomes active to signal that data can be read by the micro-controller.

At each instant, the status register 27 indicates the events taking place in the FPGA, such as reception of data, the end of transmission of data, or others. On reception of an interruption signal IT, the micro-controller reads the contents of the status register 27 to decide on what follow-up action to take, for example reading the data acquired or sending new data.

Figure 6:
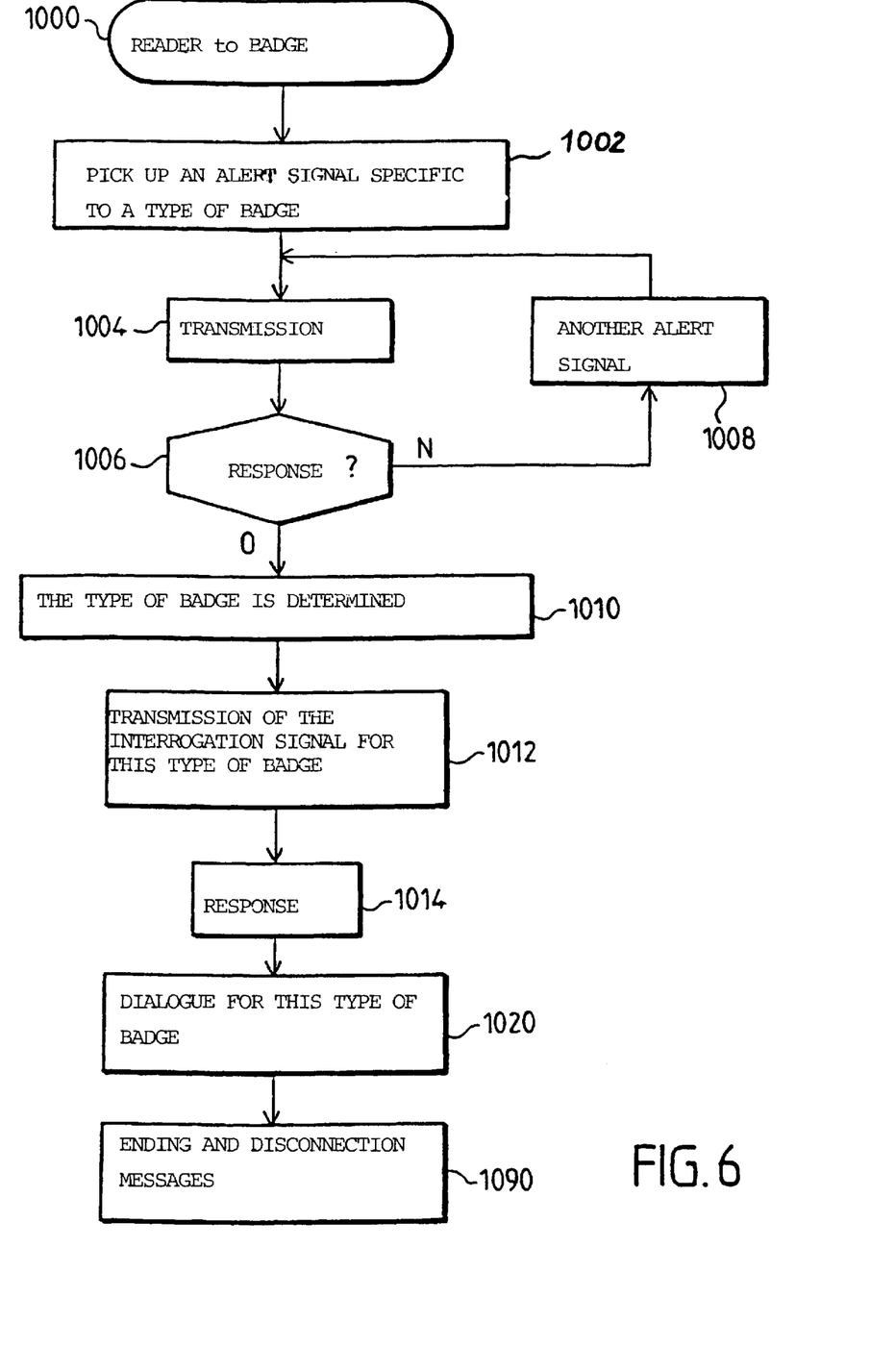
FIG. 6 is a flow-chart of the overall functioning of the badge reader.

The general functioning of the device will now be described, with reference to FIG. 6, in the form of an example of reader-badge dialogue.

Stage 1000 marks the initiation of a reader-badge dialogue, which begins on the reader's side. The reader constantly surveys its environment, to search for and detect the presence of a badge. This takes place through operations 1002 to 1008. During 1002, the reader chooses an alert signal specific to a type of badge, which in principle passes to the level of module 1. A transmission command is sent by module 1 to module 2 to carry out the transmission of this alert signal, which is then transferred into the transmission register 25. If the reader does not detect a correct response in 1006, then stage 1008 chooses another alert signal, corresponding to another type of badge, and so a loop is formed between stages 1004, 1006 and 1008.

From stage 1010, the type of badge is determined, and module 1 can now open a dialogue with the badge in a more classic fashion. The dialogue begins with the transmission of an interrogation signal (in principle, an alert signal, predetermined for the type of badge in question). The badge responds during 1014, and the different stages of dialogue for this type of badge then take place during 1020, in order to achieve the final message and disconnection. In the meantime, an operation or service of some kind has been effected, for example opening a crossing or toll gate, delivering a sum of money, carrying out a commercial transaction, or simply giving access to protected information.

Figure 7:
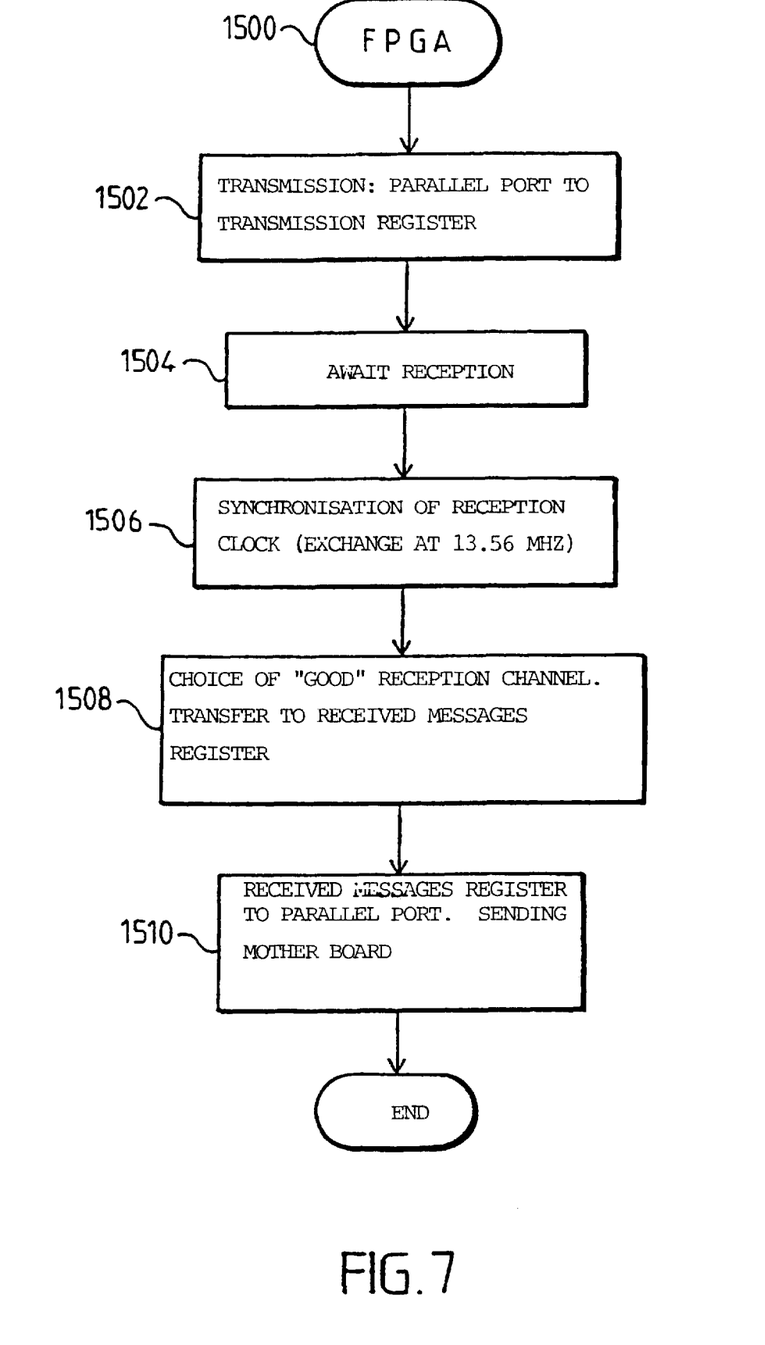
FIG. 7 is a flow-chart of the principal operations set out in module 2 of FIG. 1.

With reference to FIG. 7, the operations that should be carried out by module 2 or the FPGA, as indicated in 1500, will now be described.

FIG. 7 was conceived to define what relates to an element of dialogue comprising a transmission by the reader and the response of the badge. Firstly, the card 1 programmes module 20 into "transmission" mode, and then the data is loaded into the transmission register 25. Module 20 then triggers the transmission of the data loaded. The end of the transmission prompts an interruption IT to signal an end of transmission to module 1.

At stage 1502, the function module 20 places the commutator 220 in the position that links the parallel interface of module 1 to the transmission register 25, which is filled by the data from the card 1. Then, informed by card 1 of the completion of this preparation, module 2 (more exactly its "functions unit" 20) commands the transmission.

At stage 1504, it is placed in readiness for reception.

At stage 1506, in the presence of a signal received from the badge, it will carry out a synchronisation of its reception clock, which will be returned to later.

At stage 1508, function unit 20 of module 2 will make a choice of a "good" reception channel, in line with chosen criteria, which will also be returned to later. This operation completed, the entire message received is transferred to the reception register 26, while an interruption IT is passed on to module 1, which must then read the status register 27 and the data contained in the reception register 26.

The different functions that unit 20 must carry out can be programmed by interrogating a table of input-output connections, which is also called a "table of reference" ("Lookup Table").

The Applicant has observed that, if the forms of interrogation response between badges are very different, the working frequencies used are generally the same: 13.56 MHz for the carrier, and responses from the badge on a shifted sub-carrier of 847 kHz. This sub-carrier may be subject to a modulation in amplitude, or a modulation in numerical phase (BPSK, for Binary Phase Shift Keying). This corresponds to standard 14443C.

It remains to describe how module 2 provides the numerical reception of signals.

Within the output of stacks 616 and 626 of the two reception channels, there are signals in TTL logic, but ones which are not familiar with the clock a priori.

Module 2 or the FPGA will therefore first of all seek to synchronise themselves on the signals received at 847 kHz. At the same time, one or the other generates a reference clock at 847 kHz, to which it attributes the logic value 1. For example, the badge sends a sequence of several logic "1s" to initiate the synchronisation of the reader, this coding being enabled by a numerical phase modulation. It is alongside these stages that the FPGA will choose whichever of the two signals DaRe1 or DaRe2 that presents the best signal/noise relationship.

As represented in FIG. 4B, the commutator 223, commanded by the choice of input module (represented by dotted lines), selects one of the two signals. This selection may be effected, for example, with regard to the signals sampled at 13.56 MHz (a cyclical relationship in the presence of modulation). The input module of choice takes the decision corresponding to the greatest event probability with regard o the value of the bit received.

Thus, module 2 samples the signals received on each one of the channels at 13.56 MHz, finds an average of these samples, and takes a decision, preferably in the form of a sliding average filter (FMG). When the quality of reception is good, the sliding average is close to the extreme values corresponding to the two bits 1 or 0. On the other hand, when the sliding average is less good, an intermediate value will be obtained.

The selection of the reception channel may consist in consequence of choosing the reception channel that, at a given instant, supplies the most stable estimate of the value of the bit, or the most "frank" definition of the bit by the sliding average or, if preferred, the least doubtful.

This supposes that the selection decision between the outputs of the two reception channels is reached bit by bit. It is certainly possible to reach this decision by a more lasting method; for example throughout the whole of an expected message, or in some other way. It should be noted that in the first variant described above, the selection of the "good" route (stability of signal) takes place from the beginning of reception.

As the decisions are taken on the bits, the reception register 26 (FIG. 4B) is filled by the samples at 106 Kbits/s. In the variant represented in FIG. 4A, the two reception registers 261 and 262 can be filled, as already indicated. The content of each register may be treated in a separate fashion in this way, in line with the results obtained by the sliding average filtering described above.

The Applicant has observed that many of the problems found within the contactless badge reader systems relate to disruption or fading that may be encountered, particularly in the badge-reader direction, for various reasons that may relate to the distance between the antenna and the demodulation circuit, to the type of modulation used by the badge, or to the frequent presence of metallic masses, combined with the movements of the wearer of the badge, or to other influences nearby, in particular other similar badges. Without disrupting transmission in any way, and taking advantage of the low incidence of stationary waves, the invention would use two reception channels operating in quadrature, through the coupling mechanism 7. This allows most of the aforementioned problems with fading to be resolved, in particular when these result from electromagnetic interference, most notably from another badge.

In addition, the proposed device presents great advantages of simplicity and cost, along with multi-use.

On a different level, the small size of the device's antenna allows it to be housed in a sort of "recess", which contributes to the protection of said antenna with regard to undesirable electromagnetic influences.

In short, the functional separation between module 1 and module 2 is interesting: module 2 takes on, as it were, the management functions with regard to transmission-reception. Everything with regard to the format of messages, adaptation to a type of badge and all other characteristics corresponding to a desirable variation in functioning, is controlled by module 1, which, linked to the microprocessor, is easily adaptable to any new situation.

Of course, the current invention is not limited to the construction described. The selection of one of two reception channels, at a given instant, has been described; it would be possible, as a variant or as a complement, to fix the value of the bit through an appropriate combination of outputs from the two reception channels. It would also be possible to use more than two reception channels, and/or more than one delay in the coupling circuit 7. Although useful, the delay values given are not absolutely mandatory, and could be modified, at least within certain applications.

In addition, the coupling circuit in pi represented in FIG. 2 was described previously as an example. As a variant, a circuit in Tau (with a central dipole linked to the earth) may also be used. Furthermore, The central capacitor C of circuit 7 may be replaced by an inductance. While the inductances L on either side of the capacitor, which are linked to the earth, may be replaced by capacitors with adjusted capacitive values.

Equivalent specifications (active or not) may also be used for the different filterings and couplings, for the transmission and reception channels, for the antenna, and for the modules 1 and 2.

Therefore, as described, the interaction of modules 1 and 2 allows the central unit 1 to carry out its transmission/reception management functions, and allows it to dedicate itself fully to management. For certain applications, it would be preferable for all of the functions of modules 1 and 2 to be carried out by a single treatment unit.

In addition, several aspects described are interesting in themselves, for the advantages that are unique to them; this is independent of other characteristics of the invention. Most notable is the coupling circuit associated with the two reception channels.

What is claimed is:

1. A contactless badge reader device, including:
   transmission means;
   reception means;
   an antenna;
   a coupling circuit linking the transmission means and the reception means to the antenna; and
   management means, configured to interact with the transmission means and the reception means to establish a dialogue with a badge, wherein
   the transmission means and the reception means work on a same carrier frequency,
   the coupling circuit includes a delay element crossed by a connection between the transmission means and the antenna,
   the reception means includes two channels beginning on either side of the delay element, and
   the management means is configured to selectively utilize signals in the two channels according to a predetermined criterion.

2. The device of claim 1, wherein the management means selects one of the two channels according to the predetermined criterion.

3. The device of claim 1, wherein the delay in the coupling circuit corresponds to an eighth of a wavelength of the carrier frequency, to within a whole number of half-wavelengths.

4. The device of claim 1, wherein the coupling circuit includes a pi circuit comprising two inductors and a capacitor.

5. The device of claim 1 wherein the coupling circuit operates at low impedance.

6. The device of claim 1, wherein the antenna comprises an inductance etched onto a printed circuit.

7. The device of claim 1, wherein the transmission means includes a modulator, a transmission amplifier and a transmission filter, the transmission amplifier is configured to have a lower output impedance than the coupling circuit, and the transmission filter is comprised of passive components.

8. The device of claim 1, wherein each reception channel includes an amplitude demodulator configured to operate on the signal received in the presence of the signal transmitted at a strong level, and a shift pre-filtering of the carrier.

9. The device of claim 8, wherein the amplitude demodulators are double alternating.

10. The device of claim 1, wherein the management means includes a microprocessor command unit equipped with a parallel port, and a programmable network, configured on one side with a transmission register and a received message register connectable selectively to the parallel port, and on another side with two reception registers connectable selectively to the received message register, and on another side again with a functions module configured to command the transmission means, reception means and commutations, and interconnected to maintain a dialogue with the microprocessor command unit, particularly in interruption mode and circuit selection mode, with regard to messages transmitted and received.

11. The device of claim 10, wherein the microprocessor command unit is configured to manage specific transmission and reception formats.

12. The device of claim 10, wherein the programmable network is configured to sample signals received at a high frequency and to decide on a value of a bit each time.

13. The device of claim 12, wherein the programmable network is configured to decide the value of the bit by sliding average filtering.

14. The device of claim 10, wherein the microprocessor command unit is configured to manage specific transmission and reception formats, including at least one of redundant codes and service bits.

15. The device of claim 1, wherein the management means in configured to select the most stable of the signals in the two channels.

16. A contactless badge reader device, comprising:

a transmitter;

a receiver;

an antenna;

a coupling circuit linking the transmitter and the receiver to the antenna; and a management unit configured to interact with the transmitter and the receiver to establish a dialogue with a badge, wherein the transmitter and the receiver work on a same carrier frequency, the coupling circuit includes a delay element crossed by a connection between the transmitter and the antenna, the receiver comprises two channels beginning on either side of the delay element, each channel including a demodulator, and the management unit is configured to selectively utilize signals in the two channels according to a predetermined criterion.

17. A contactless badge reader device, comprising:

a transmitter;

a receiver;

an antenna;

a coupling circuit linking the transmitter and the receiver to the antenna; and a management unit configured to interact with the transmitter and the receiver to establish a dialogue with a badge, wherein the transmitter and the receiver work on a same carrier frequency, the coupling circuit includes a delay element crossed by a connection between the transmitter and the antenna, the receiver comprises two channels beginning on either side of the delay element, and the management unit is configured to selectively utilize signals in the two channels according to a predetermined criterion.

18. The device of claim 17, wherein the management unit selects one of the two channels according to the predetermined criterion.

19. The device of claim 17, wherein the delay in the coupling circuit corresponds to an eighth of a wavelength of the carrier frequency, to within a whole number of half-wavelengths.

20. The device of claim 17, wherein the coupling circuit includes a pi circuit comprising two inductors and a capacitor.

21. The device of claim 17, wherein the coupling circuit operates at low impedance.

22. Contactless badge reader device, including transmission means and reception means working on the same carrier frequency, and linked by a coupling circuit to an antenna, together with management means, which interacts with the transmission means and the reception means to establish a dialogue with a badge, wherein the coupling circuit to the antenna includes a delay element, crossed by the connection between the transmission means and the antenna, the reception means consists of two channels, beginning on either side of the delay element, the management means works together to exploit selectively the reception channels according to a chosen criterion, each reception channel includes an amplitude demodulator configured to operate on the signal received in the presence of the signal transmitted at a strong level, and a shift pre-filtering of the carrier.

23. The device of claim 22, wherein the amplitude demodulators are double alternating.

24. Contactless badge reader device, including transmission means and reception means working on the same carrier frequency, and linked by a coupling circuit to an antenna, together with management means, which interacts with the transmission means and the reception means to establish a dialogue with a badge, wherein the coupling circuit to the antenna includes a delay element, crossed by the connection between the transmission means and the antenna, the reception means consists of two channels, beginning on either side of the delay element, the management means works together to exploit selectively the reception channels according to a chosen criterion, and the management means includes:
- a microprocessor command unit equipped with a parallel port, and
- a programmable network, configured on one side with a transmission register and a received message register connectable selectively to the parallel port, and on another side with two reception registers connectable selectively to the received message register, and on another side again with a functions module configured to command the transmission means, reception means and commutations, and interconnected to maintain a dialogue with the microprocessor command unit, particularly in interruption mode and circuit selection mode, with regard to messages transmitted and received.

25. The device of claim 24, wherein the microprocessor command unit is configured to manage specific transmission and reception formats, including at least one of redundant codes and service bits.

26. The device of claim 24, wherein the programmable network is configured to sample signals received at a high frequency and to decide on a value of a bit each time.

27. The device of claim 26, wherein the programmable network is configured to decide the value of the bit by sliding average filtering.

* * * * *